United States Patent [19]

Hekker et al.

[11] Patent Number: 5,151,822
[45] Date of Patent: Sep. 29, 1992

[54] TRANSFORM DIGITAL/OPTICAL PROCESSING SYSTEM INCLUDING WEDGE/RING ACCUMULATOR

[75] Inventors: Roeland M. T. Hekker, Fairfield, Iowa; Izhak M. Livny; Gregory S. Mercurio, both of San Jose, Calif.

[73] Assignee: E. I. Du Pont de Nemours and Company, Wilmington, Del.

[21] Appl. No.: 497,878

[22] Filed: Mar. 19, 1990

Related U.S. Application Data

[63] Continuation-in-part of Ser. No. 920,513, Oct. 17, 1986, abandoned.

[51] Int. Cl.⁵ .............. G02B 27/46; G06K 9/76; G06K 9/36; G06E 3/00
[52] U.S. Cl. .................................. 359/559; 250/550; 359/561; 364/822; 382/31; 382/42; 382/43
[58] Field of Search ............... 350/3.66, 3.82, 162.12, 350/162.13; 382/31, 42, 43, 14, 15, 16, 19, 23; 364/822; 250/550; 359/29, 558, 559, 560, 561

[56] References Cited

U.S. PATENT DOCUMENTS

| | | | |
|---|---|---|---|
| 3,869,697 | 3/1975 | Kawasaki | 350/162.12 |
| 3,944,978 | 3/1976 | Jensen et al. | |
| 4,388,610 | 6/1983 | Tsunekawa | 382/23 |
| 4,449,240 | 5/1984 | Yoshida | 382/15 |
| 4,589,140 | 5/1986 | Bishop et al. | 382/14 |
| 4,715,683 | 12/1987 | Gregory et al. | 350/3.66 |
| 4,878,736 | 11/1989 | Hekker et al. | 350/162.13 |
| 4,893,346 | 1/1990 | Bishop | 382/14 |

OTHER PUBLICATIONS

"Optical Processing and Neurocomputing in an Automated Inspection System", David E. Glover, Journal of Neural Network Computing, Fall, 1989, pp. 17-37.

"Automated Inspection via Neural Network Classification of Optically Derived 2-D Fourier Feature Signatures", David E. Glover (Proceedings of the Instrument Society of America ISA/88 Conference, Houston, Oct. 1988).

"Automated Quality and Process Control Based on an Optical Fourier/Electronic Neurocomputer System", David E. Glover, Ph.D., First Annual Meeting, International Neural Network Society, Sep. 6-10, 1988, Boston.

"Real-Time Image Classification Based on Neural Network Classification of Optically Derived 2-D Fourier (List continued on next page.)

Primary Examiner—Bruce Y. Arnold
Assistant Examiner—Martin Lerner
Attorney, Agent, or Firm—Thomas H. Magee

[57] ABSTRACT

A transform digital optical processing system generates a transform signal of an image. Fourier or other well-known transforms may be employed. The transform signal may be generated in one of two ways: optically or electronically. In optical generation a two dimensional object is generated by modulating a beam of coherent light with an image of the object. A transform image of the modulated coherent light beam is formed, using an optical transform element. The optical transform is then stored in a two dimensional buffer. The transform signal may also be generated electronically by storing a digital video image of an object and generating a Fourier or other transform of the digital video image using vector processing chips or other commercially available digital transform generating computers. This digitally generated information may be analyzed and classified through a neural network type processor. The two-dimensional transform data is then processed to obtain the inspection or other characteristics for comparison against predetermined characteristics. The two dimensional transform is divided into two types of zones, namely wedges and rings. The transform data is then mapped into a corresponding wedge and ring, and the data for each wedge and ring is accumulated or summed to obtain data values. It has been found that the summed wedge and ring data values can accurately characterize an image for inspection or other comparison purposes.

62 Claims, 7 Drawing Sheets

OTHER PUBLICATIONS

Feature Signature", David E. Glover, (Proceedings of the Neural Architecture for Computer Vision Workshop AAAI-88, Minneapolis/St Paul, Aug. 1988).

"A Hybrid Optical Fourier/Electronic Neurocomputer Machine Vision Inspection System", David E. Glover (Proceedings of the Vision 1988 Conference, Detroit, Jun. 1988, sponsored by Society of Manufacturing Engineers, Dearborn, Mich.).

"Machine Vision Systems Set to Exploit Artificial Neural Networks", AI Business, Jul. 28, 1988, p. 5.

"Large Capacity Phase-only Encoded Smart Correlators", Bahram Javidi, SPIE vol. 956 Piece Recognition and Image Processing, 1988, pp. 62–72.

"Comparison of Bipolar Nonlinear Correlators and Phase-only Encoded Matched Filter Correlators", Bahram Javidi, SPIE, vol. 956, 1988, pp. 94–103.

"Hybrid Optical/Electronic Pattern Recognition with Both Coherent and Non-coherent Operations", J. Lynn Smith & Douglas Devoe, SPIE vol. 938, Digital and Optical Shape Representation and Pattern Recognition, 1988, pp. 170–177.

"Characterization of Corneal Specular Endothelial Photomicrographs by their Fourier Transforms", Barry P. Masters, SPIE vol. 938, 1988, pp. 246–250.

"PSRI Target Recognition in Range Imagery Using Neural Networks", S. E. Troxel, S. K. Rogers, M. Kabrisky & J. P. Mills, SPIE vol. 938, 1988, pp. 295–301.

"Application of Binary Phase-only Correlation to Machine Vision", David L. Flannery, John S. Loomis, Mary E. Milkovich, Paul E. Keller, Optical Engineering, vol. 27, No. 4, Apr. 1988, pp. 309–320.

"Neural Networks at Work", Scientific American, Nov., 1988, p. 134.

"Neural Computing Aids Machine Vision", Electronic Engineering Times, Feb. 15, 1988, p. 47.

"Optical Computing and Image Processing with Ferroelectric Liquid Crystals", K. M. Johnson, M. A. Handschy, L. A. Pagano-Stauffer, Optical Engineering vol. 26, No. 5, May, 1987, pp. 385–391.

"Real-time Optical Associative Retrieval Technique", Hua-Kuang Liu, S. Y. Kung, Jeffrey A. Davis, Optical Engineering, vol. 25, No. 7, Jul. 1986, pp. 853–856.

"Hybrid Image Processing", B. Braunecker, R. Hauck, A. W. Lohmann, Photographic Science and Engineering, vol. 21, No. 5, Sep./Oct. 1977, pp. 278–281.

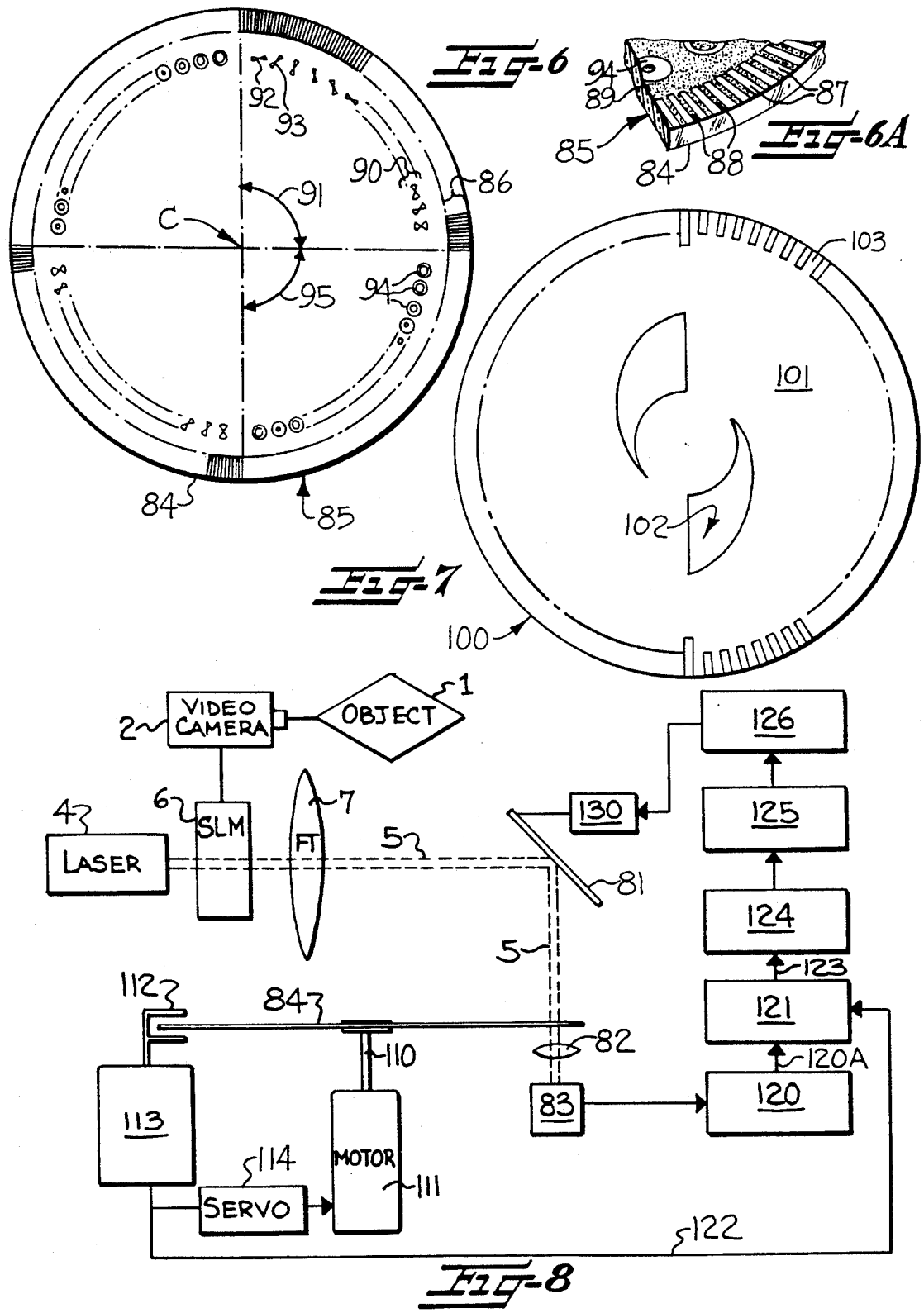

TRANSFORM DIGITAL/OPTICAL PROCESSING SYSTEM INCLUDING WEDGE/RING ACCUMULATOR

This application is a continuation-in-part of U.S. Pat. application Ser. No. 920,513, filed Oct. 17, 1986, now abandoned.

1. Field of the Invention

This invention relates to a system where the image of the object is processed optically or digitally using a transform image, and more particularly to a system for accumulating transform data representing an image.

BACKGROUND OF THE INVENTION

Machine vision or inspection systems have become a vital component in integrated manufacturing systems. They can sort, package, and perform defect analysis without human intervention. For instance, by inspecting holes being drilled the system can determine if a drill bit is worn.

Most machine vision systems have been based upon digital electronic technology that uses serial or one dimensional processing. For instance, an image is captured and stored as a matrix of electrical signals. The image is then preprocessed to enhance edges, improve contrast, and otherwise isolate the object to be recognized. A comparison function compares the enhanced image to one or more stored reference images. Since the images being processed are two dimensional, very intensive processing is required. Consequently, previous digital systems were very slow.

In order to avoid the problems associated with the available digital hardware it has been proposed to employ optical systems to perform inspection. An optical inspection system is disclosed in the parent application Ser. No. 920,513. While the optical systems were faster than previous digital systems, they were less accurate, because of the inherent imperfections in optical elements, thereby creating problems in defining inspection criteria.

In some systems, the image to be processed is converted into a Fourier or other known transform domain. A transform maps all of the information about the image of the object into a very useful, symmetrical pattern which represents the object in terms of its spatial frequencies. However, the calculation of a transform on a digital computer is extremely intense, so that digital transform systems have not heretofore been practical. Moreover, optical transform systems, of the type disclosed in parent application Ser. No. 920,513 have been unable to rely on the symmetry of transform patterns because of the imperfections in optical transform elements.

SUMMARY OF THE INVENTION

Accordingly, it is an object of the present invention to provide a high speed optical inspection system.

It is another object of the present invention to provide an accurate optical inspection system.

It is yet another object of the present invention to provide an optical inspection system with simple inspection criteria.

It is still another object of the present invention to provide an optical inspection system which operates upon transformed data on a digital computer at high speeds.

It is yet another object of the present invention to provide an optical inspection system which operates upon transformed data having certain symmetric properties on a digital computer at high speeds by relying on the symmetry of the transformed data.

These and other objects are provided according to the present invention by generating a transform signal of an image. The transform signal may be a Fourier transform, however other well known transforms may be employed. The transform signal may be generated in two ways: optically or electronically. In optical generation, a two dimensional real image of an object is generated by modulating a beam of coherent light with an image of the object. A transform image of the modulated coherent light beam is formed, using an optical transform element. The optical transform image is detected by a camera or two-dimensional light sensitive device or other similar device and the resulting transform video signal is then stored in a two dimensional buffer including, for example, 256 rows and 256 lines of transform data points.

In electronic generation a video image of the object is converted to a digital video signal, and a Fourier or other transform is generated using vector processing chips or other commercially available digital transform generating computers or chips. Digital generation of the transform signal provides a more accurate transform, thereby allowing the symmetry of the transform to be employed to reduce the number of calculations necessary to obtain accurate data.

According to the present invention, the two dimensional transform data (whether derived electronically or optically) is then processed to obtain inspection or other characteristics for comparison against predetermined characteristics. In other words, the complete digitally stored two dimensional transform, which may include over 65 thousand pixels or data points is not compared to a predetermined two dimensional transform on a point by point basis to determine whether the object meets certain criteria. Rather, according to the invention, it has been determined that the transform may be divided into a small number of zones, and the transform data for all data points which lie in the zone may be summed to obtained a value for that zone. The small collection of summed zone data values may then be compared to a stored set of summed zone data values.

In particular, according to the present invention, it has been found that the two dimensional transform may be divided into two types of zones called wedges and rings, because they define wedge-shaped and ring-shaped areas of the two dimensional transform. These wedge and ring zone shapes are used to extract the angular and radial components of the transform image, respectively. In one embodiment, eight wedges and five rings may be defined. The transform data (for example, the intensity of each pixel) is then mapped into a corresponding wedge and ring, and the data for each wedge and ring is accumulated or summed to obtain, for example, 13 data values. It has been found that the summed wedge and ring data values can accurately characterize an image for inspection or other comparison purposes.

When the two dimensional transform data is obtained optically, the entire transform is typically employed to obtain the wedge/ring data. On the other hand, when the transform data is obtained electronically, only half of the transform data is employed for the wedge/ring computation because the transform process is more accurate, thereby allowing faster calculation.

According to another aspect of the present invention, wedge and ring data may be accumulated in parallel, in a pipelined processor. In particular, each data point of the transform may be mapped to both a wedge and ring simultaneously, so that calculation time is halved. For electronically generated transform data, only half of the transform need be accumulated into wedges and rings. For optically generated transform data, all of the transform image data is mapped into wedges and rings, with wedge and ring mapping occurring simultaneously. In either case, parallel processing of wedge/ring data decreases computation time and increases system efficiency and inspection speed.

According to yet another aspect of the present invention, the collection of optically or electronically derived summed zone data values (such as wedge and ring data values) is processed or classified by a neural network. In general, neural networks are highly distributed nonprogrammed adaptive computing systems based on multiprocessor architectures and varied dense interconnection schemes. These networks provide better classification capability than other previously known systems. The use of neural networks in this manner allows for much greater accuracy in the analysis and classification of the wedge and ring data.

BRIEF DESCRIPTION OF THE DRAWINGS

FIGS. 6, 6A and 7 illustrate alternate embodiments of sampling disks for use in a Fourier transform detector.

FIG. 8 is a schematic block diagram illustrating a second embodiment of the system of the present invention.

DESCRIPTION OF THE INVENTION

Figure 1:
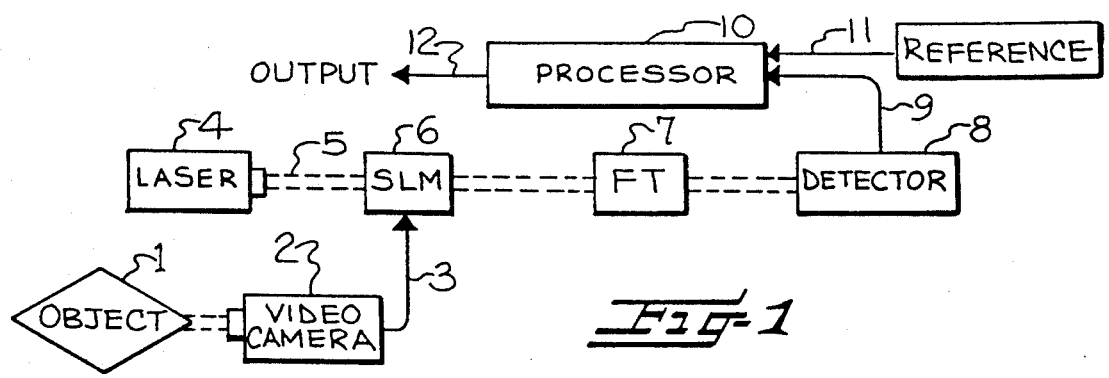
FIG. 1 is a schematic block diagram illustrating one embodiment of the system of the present invention.

FIG. 1 is a block diagram illustrating one embodiment of the optical processing system of the present invention. The image of an object 1 to be processed is received by a device such as a video camera 2 that generates a first electrical signal in response to the image 1. A laser 4 provides a beam of collimated light 5 that is incident upon a spatial light modulator 6. The modulator forms an image of the object in response to the first electrical signal, and the image is transferred to the coherent light beam. A Fourier transform image or other transform of the modulated coherent light beam is formed by the means 7 and focused upon the detector 8. The detector generates a second electrical signal on line 9 that is received by a processor 10 and compared to a reference signal representing a known image on line 11. The processor provides an output signal on line 12 representing the differences between the known image and the object.

The object 1 to be optically processed may be the actual object, such as a bottle, can, metal part, etc., or the image of an object that is generated in a focal plane for the video camera. Alternatively, it may be a preprocessed image that has been enhanced or filtered to highlight certain features or suppress a background, or it may be a presentation of the Moire interference fringes representing the three dimensional features of the object.

The image of the object is brought into the optical processing system by some means for generating an electrical signal in response to the image, such as a standard video camera 2. It may be any of several video cameras that are currently commercially available and have, for example, an RS-170 electric output. The output is present on line 3. While the image output of a standard video camera is readily decoded and transformed into a recognizable image by a commercially available television, other means, such as an electronic or electro-mechanical scanner, may be used.

A laser, or other device, provides a coherent beam of light 5 and defines an optical path for the optical processing system. It may be a laser diode or gas laser. The output power from the laser may be monitored by a photodetector 15 (FIG. 2) which intercepts a reverse beam from the laser, or a portion split from the output beam. The signal from the photodetector is used as part of a feedback loop to adjust the output power from the laser. The optical path in FIG. 1 is illustrated as being linear, although it may be bent as necessary or desirable using mirrors, prisms, or other suitable means.

A spatial light modulator 6 is disposed in the optical path and displays the image captured by the video camera 2 as represented by the electrical signal on line 3. The spatial light modulator of the present invention may be liquid crystal device, as is commercially available. A liquid crystal device typically comprises a liquid crystal cell sandwiched between a pair of polarizers. The liquid crystal cell comprises individually addressable liquid crystal modules that are disposed in a two dimensional array.

The tilt and twist of each liquid crystal module or pixel varies with applied voltage, and this affects the polarization of the light incident upon the cell. The device polarizers are typically crossed with respect to each other. If the liquid crystal device is driven by a standard video signal, such as the output from a standard video camera, the image will be generated on the liquid crystal device one pixel at a time, in a manner similar to the way an image is generated on a standard television receiver.

Assuming that the video camera has a standard video signal output, it will typically scan the object one pixel at a time across a first horizontal line, retrace to a second horizontal line, and scan that line one pixel at a time. This sequence continues until the entire image has been scanned, and usually takes 33 milliseconds.

The pixel response time of a liquid crystal device is a complicated function of the material, temperature, and applied signal. Generally, the time period may be divided into a rise time (the time to achieve 90% of maximum transmission), a retention time (the time it stays above 90%), and fall time (the time to fall from 90% to some smaller threshold value). For the succeeding Fourier transformation of the image to be valid, it must be made at a time when the image quality is good and the entire image is displayed on the spatial light modulator. Depending upon the response time of the liquid crystal device, the speed with which the video signal is supplied, and the retention and fall times for the liquid crystal device, some of the pixels may have decayed while others have not yet peaked, or may not have been transmitted. Not only will the image be incomplete, image quality and contrast may suffer. On the other hand, if the image on the liquid crystal device has not decayed by the time that the signal representing the new image is provided, the new image will be contaminated and the modulation of the coherent light beam will not accurately represent the image presented.

To resolve these problems, an active liquid crystal display using built-in thin film transistors to hold each pixel value may be desirable. Alternatively, one may use a frame buffer which electrically stores and maintains an entire image or frame from the video camera and continuously refreshes or quenches the image on the liquid crystal device. The design of a device to accept the standard video camera output and adapt it to a two dimensional frame buffer compatible with a liquid crystal device is well within the capabilities of one skilled in the art of electronic circuit design.

Still further improvement may be made in the use of a liquid crystal device for a spatial light modulator by increasing the response time of the device, but this also typically results in a reduction in contrast. For instance, a thinner layer of liquid crystal modules has a faster response time, but less image contrast. To provide acceptable contrast at longer wave lengths of coherent light, a thicker layer of liquid crystal modules is preferred in the present invention, such as in the range of 3 to 7 microns thick. The response time can be improved by heating the liquid crystal device. In addition, it is desirable to maintain the device at a constant temperature to ensure that its response time is uniform. This may be done, for example, by placing the liquid crystal device in a heated cavity or heating it around the edges with resisters or thermal tape. The temperature is typically maintained in the range of 35x to 50xC and a thermistor may be used to provide an electric feedback signal to maintain the device at the predetermined temperature. On the other hand, it may be desirable to cool the liquid crystal device to increase the retention time. The design of an appropriate temperature control circuit is well within the capabilities of one skilled in the art of electrical circuit design.

To ensure that phase distortions are not introduced into the Fourier or other transform image, optical flatness of the surfaces of the spatial light modulator is essential. The lack of optical flatness distorts and scatters the coherent light, making it impossible to generate the accurate coherent transformations required for optical processing. The optical correction may be done with an optical element, or through the use of a correcting hologram having optical properties that are the inverse of any phase or other wavefront distortions. The method of making such a hologram to compensate for the unwanted spatial phase variations are disclosed in *Optics Letter*, June 1986, pages 398–400, D. Casasent and S. Xia, which is incorporated herein.

The coherent light beam 5, modulated with the image of the object by the spatial light modulator, is incident upon still further means in the optical path for forming the Fourier or other transform or signature of the image of the object. While the Fourier transform is illustrated in the embodiments disclosed herein, it will be understood by those having skill in the art that other transforms, such as Mellin transforms, may be employed. The Fourier or other transform presents all information about the image mapped into asymmetrical pattern which represents the object in terms of its spatial frequencies. Visual features that are close together create high spatial frequencies and those features that are farther apart create lower spatial frequencies. Low frequencies are distributed toward the center of the transform and the higher frequencies farther away from the center toward the outer edge. The orientation of the features creating these frequencies are also mapped with vertically distributed features having their frequencies vertically distributed in the transform, and horizontally distributed features having their frequencies distributed horizontally in the transform. If the image is rotated, the frequency distribution rotates in the same fashion. This predictable mapping occurs on all features in the image regardless of the position of the feature. If a portion of the image moves to another place in the overall view, the Fourier or other transform will be basically unaffected for those visual features within the portion that moved. The only change will be if the features are now in a new spatial relationship to the rest of the items in the overall view. This characteristic provides "shift invariance" to the mapping of the Fourier or other transform for each object image. The Fourier or other transform is also symmetrical from top to bottom and from left to right so that each semicircle of the image contains exactly the same information. This symmetry is the basis for the design of the detector, with one half decoding the frequency distribution and the other half decoding the frequency orientation.

The Fourier or other transform is generated by a device such as a high quality glass lens transforms the information and focuses it into the optical plane of the lens. The lens performs the Fourier transform because it approximates a quadratic phase function. As an alternative, a hologram of a quadratic phase function will also perform a Fourier or other transform. In addition, the hologram may contain other transmission functions besides the quadratic phase function, and may, for instance, provide the phase correction for the spatial light modulator or other optical elements in the optical path. For instance, the hologram may be the complex conjugate of the phase function of the liquid crystal device multiplied by the desired quadratic phase function of the Fourier or other transform. When this hologram is illuminated by a plane wave, it provides an optically flat, phase compensated Fourier or other transform of the image modulated onto the coherent light beam by the spatial light modulator.

Figure 2:
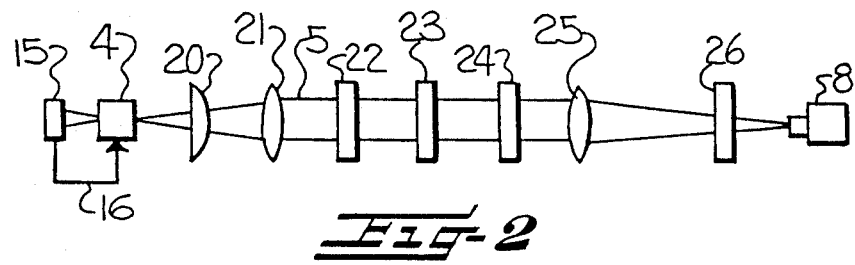
FIG. 2 is a schematic block diagram illustrating one embodiment of the optical path for the present invention.

Referring to FIG. 2, the elements in the optical path may comprise the laser 4 which provides the coherent light beam 5. As illustrated, the forward beam may be divergent and may have an elliptical cross section. An imaging system may be used as necessary or desirable to collimate the beam and circularize its cross section. This may include, for example, cylindrical lenses 20, 21. The polarization axis of the coherent light is preferably aligned with the polarization axis of the liquid crystal device 23, or, in the alternative, an input polarizer 22 may be used.

The collimated, polarized light beam passes through the spatial light modulator 23 which contains an image of the object to be processed. The spatial light modulator may comprise, for example, a liquid crystal cell or a magneto-optic device of the type available from Semetex, a division of Litton Industries, Inc. A holographic optical element or other device 24 may be used to correct any wavefront distortion introduced by the liquid crystal device or other elements in the optical path, or to correct for polarization flatness. A lens 25 forms the two dimensional Fourier transform of the image on the liquid crystal device, focusing the transformed image at the detector 8. As noted earlier, lens 25 may also be a holographic optical element, or may be combined with the holographic optical element 24. A polarizer 26 is disposed in the optical path and cooperates with the liquid crystal cell to from the image. The polarizers 22, 26 are normally affixed directly to the liquid crystal cell, but they may be removed therefrom to minimize or correct wavefront distortion or otherwise improve the image. The optical path ends at the light detector 8 and any further processing takes place in the digital electronic circuitry. FIGS. 1 and 2 illustrate a linear optical path, which requires that the spatial light modulator and other elements disposed in the optical path transmit light therethrough. In the alternative, the optical path may be bent, using mirrors, prisms, or other devices. The spatial light modulator 6, 23 may also be of the reflective type where the angle of incidence of the coherent light beam may be, for example, 20 degrees.

The light detector is placed in the focal plane of the Fourier or other transform image. It detects the Fourier or other transform image of the modulated coherent light beam and generates an electrical signal on line 9 in response thereto. The image is detected by measuring the amount of light incident on the various spatial domains of interest, as illustrated by the wedges and rings in FIG. 4. These domains may be physically defined on a semiconductor array, as illustrated in U.S. Pat. No. 3,689,772 to George. Alternatively, they may be defined by electronically segmenting a rectangular or circular two dimensional matrix into wedges and rings as illustrated in FIGS. 3 and 4, or by sampling the Fourier transform segments sequentially in time by passing apertures on a rotating disk through the Fourier or other transform plane, as illustrated in FIGS. 6-8.

Figure 3:
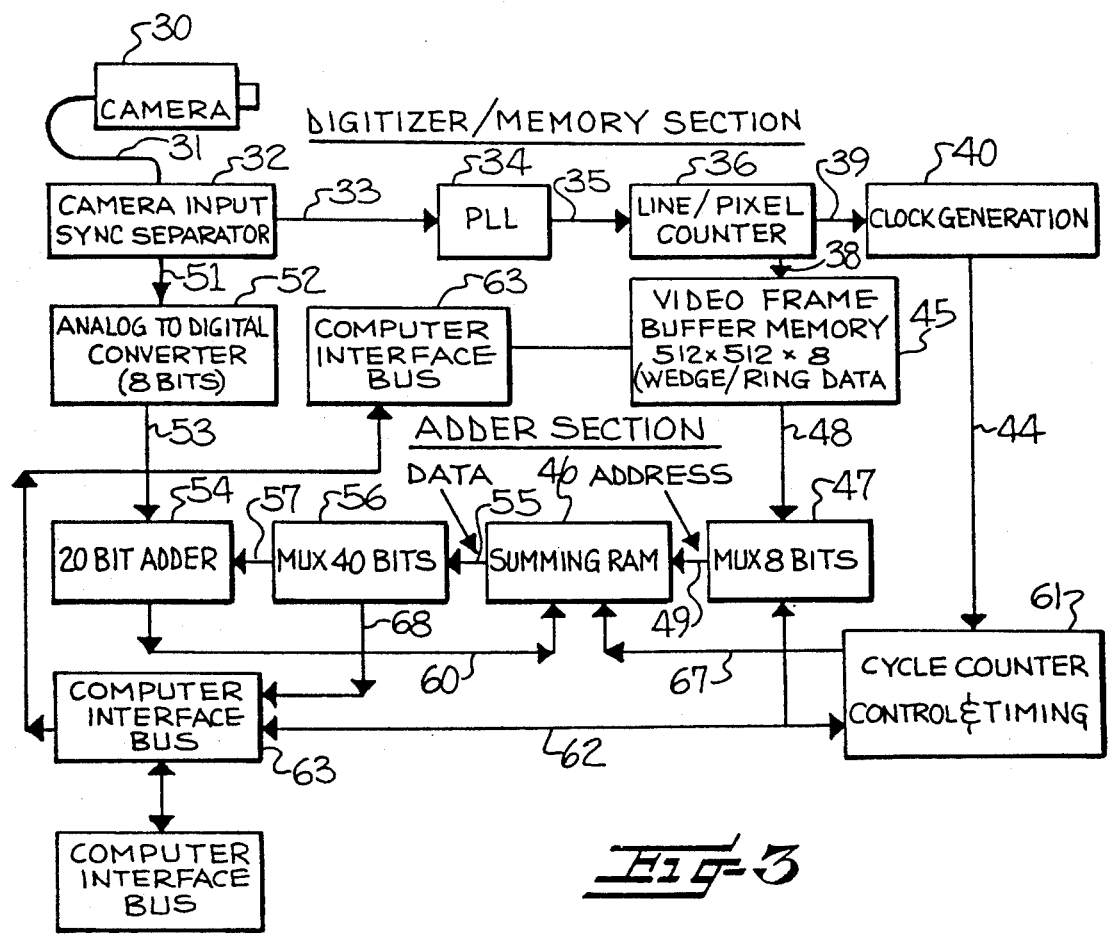
FIG. 3 is a schematic block diagram illustrating one embodiment of the means for detecting the Fourier transform image and generating an electrical signal representative thereof.
Figure 4:
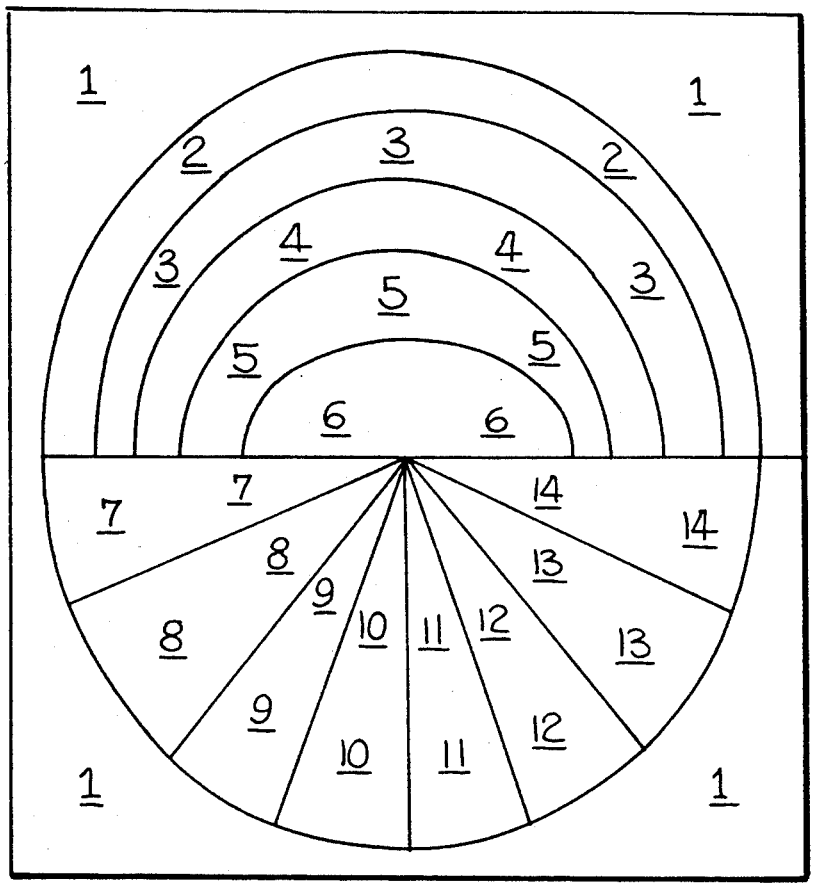
FIG. 4 illustrates the regions of a wedge-ring device for detecting the Fourier transform and generating an electrical signal.

Referring to FIG. 3, the detector may comprise a light sensor which generates electric signals representing a two dimensional image of the Fourier or other transform, electronic circuitry which digitizes the image and stores it for analysis, and electronic circuitry which adds together the intensity of each of the image pixels comprising the Fourier or other transform image in each of the wedge and ring shaped domains 2-14 identified in FIG. 4. The number of domains may vary as necessary or desirable.

FIG. 3 generally illustrates circuitry for detecting the Fourier or other transform image. It detects the modulated coherent light beam, divides the light beam into a series of semicircular and wedge shaped portions, and sums the intensity of the light in each of the individual semicircular or wedge shaped portions. The intensity of the light in each of these portions is a representation of the Fourier or other signature of the object being inspected.

More specifically, FIG. 3 illustrates a camera 30 such as a video camera described above that has a standard composite video television output. This includes an area portion signal (line and pixel location within the line) identifying an area within the Fourier or other transform image, and a corresponding video or feature portion signal that identifies a feature of the Fourier or other transform image in the located area. The area portion signal may be decoded to represent a particular line and pixel location, and the feature signal may be decoded to represent the intensity of the image at the corresponding area location. The camera output signal on line 31 is provided to the camera input sync separator 32 which separates the area portion signal from the feature portion signal.

The area portion signal is provided on line 33 to the phase lock loop device 34 which isolates and decodes the area portion signal and outputs a synchronizer signal on line 35 to the line/pixel counter 36. The line/pixel counter converts the synchronizer signal to an address signal on line 38 and a timing signal on line 39.

The clock generation device 40 receives the synchronizing signal on line 39 and provides a signal on line 44 to the cycle counter to identify each successive single video frame. Each successive video frame initiates a new cycle for the detector.

The address signal on line 38 identifies specific locations in a video frame buffer memory 45. The video frame buffer memory is, in this example, a 512 by 512 by 8 bit memory. Thus, the image storage area consists of 512 lines having 512 pixels per line, and the line/pixel counter converts the area location signal to the corresponding address signal for the video memory. Each storage position stores an 8 bit word representing an address for the summing RAM 46. The address for RAM 46 is output from the video memory on line 48, through multiplexer 47, and onto line 49. The video frame buffer memory 45 functions as a real time look-up table which relates the line and pixel position of the camera 30 to the zones defining the wedge-ring pattern of FIG. 4. Thus, as the camera scans the Fourier or other transform image from left to right along a line, the video memory converts the line/pixel location signal to a signal representing one of the wedge or ring shaped domains or zones 1-14 in FIG. 4.

An important feature of the video frame buffer memory is that any desired pattern of pixel summation can be preloaded into the video frame buffer memory. This permits one to personalize the means for detecting the Fourier or other transform image to isolate certain features and provide the desired degree of resolution. Additional advantages of defining the wedge and ring shaped domains in a programmable look-up table means that the number of domains may be modified easily for different types of recognition problems. Instead of 64 wedges and 64 rings, it would be possible to provide 128 wedges and 128 rings. The detector may also be reconfigured into rings only, or wedges only, or still other different geometries. A critical function in any Fourier or other transform sampling system is to attenuate the central DC peak light energy that always appears in the center of the Fourier transform image. The central peak is orders of magnitude higher in energy than the more distant points, but they contain the information of interest. The present embodiment allows hardware or software control of the attenuation of the DC peak, including narrowing and widening as the situation requires. This embodiment also avoids certain critical problems of alignment and centering which are inherent in optical systems and other Fourier transform sensing approaches.

The second portion of the means for detecting the Fourier or other transform processes the feature or video portion of the image signal. In this embodiment it comprises an adder section that also processes the pixel information in real time. It sums the intensity of the current Fourier or other transform image pixel with the stored value of all previously scanned pixels in the same domain, and stores the result in a memory location specified by the 8 bit address data obtained from the frame buffer memory. Referring to FIG. 3, the video signal from the camera input sync separator is provided on line 51 to the analog to digital converter 52. The digital output on line 53 is an 8 bit representation of the intensity of the incident modulated coherent light beam at the area (line and pixel location) being detected by the camera, i.e. the current intensity signal. The converter 52 may operate at rate of 10 MHZ, and the data is passed to the 20 bit adder 54. Adder 54 sums the current intensity signal on line 53 with the signal on line 57 representing the sum of the intensity of all pixels previously scanned in the same domain of the same Fourier or other transform image. This is done as follows.

During analog to digital conversion of the feature portion signal, the line/pixel counter 36 addresses the video frame buffer memory 45 to convert the corresponding area portion signal to a zone or domain address signal, which represents one of the wedge or ring domains 1-14 illustrated in FIG. 4. This address signal from the video memory is routed through the 8 bit multiplexer 47 via line 49 to the summing RAM 46.

The address presented to the summing RAM 46 from the video memory identifies the location storing a 20 bit word which represents the summation of all pixel locations previously scanned for the wedge or ring domain that encompasses the current pixel location. The data representing this sum is provided on line 55 to the 40 bit multiplexer 56 and output on line 57 to the 20 bit adder 54. In adder 54 the data representing the intensity of the current pixel location is added to the data representing the summation of all previous pixel locations within the wedge or ring domain identified by the video memory. This addition is performed with an integer accuracy of 20 bits at real time rates. The data representing the result of this addition is placed on line 60 and stored back in the summing RAM 46 in the location specified by the current address pointer from video memory 45. This addition and substitution process continues until the intensity for each pixel in each wedge or ring domain has been summed for the entire Fourier or other transform image.

The process of adding the data representing the intensity of each of the pixel locations is initiated by a control signal from the cycle counter 61. At the beginning of each video frame, the cycle counter receives a signal on line 44 from the clock generator 40 and enables the summing RAM 46 via write enable line 67 so that data may be stored therein during the time that the entire frame is scanned, i.e. 33.3 milliseconds. After the entire frame is scanned, the cycle counter disables the summing RAM write enable input and requests an interrupt from the microprocessor on line 62 from the computer interface bus 63. Upon interruption, the controlling processor transmits an address signal through line 62 to the 8 bit multiplexer 47 and opens a data path through the 40 bit multiplexer 56 to read the final wedge and ring domain intensity summation results from the summing RAM 46, via line 68. The memory locations of the summing RAM are then set to zero to prepare for the summation cycle for the next video frame. The final Fourier or other transform analysis may then be performed by a processor external to the video processing unit.

Referring to FIG. 1, the wedge and ring domain intensity values from the detector are transferred to a processor 10. To initialize the optical processing system, the system is presented "good" objects and the data representing a Fourier or other transform signature of the god object is recorded as a reference. In operation, as each object is inspected by the optical processor, the data representing the Fourier or other transform of is image is compared by the processor 10 to the Fourier transform signature for the good part. An output signal on line 12 distinguishes acceptable objects from "bad" objects, which represent a different signal for the Fourier transform image.

Alternate embodiments for the detector may include placing either a fixed or variable mask in front of a one or two dimensional detector in order to sample portions of the Fourier transform image. For instance, the mask may be a liquid crystal device having addressable portions disposed in the plane of the Fourier or other transform image. Wedge and ring shaped domains may be activated sequentially in the liquid crystal device and the intensity of the Fourier transform may be read on a single photodetector. See, for example, the discussion regarding FIGS. 6-8.

In another alternate embodiment, the Fourier or other transform of an image could be detected by a standard analog camera array which is rotated or physically moved to identify different wedge and ring shaped domains. The intensity of the light in each domain would then be recorded.

Figure 5:
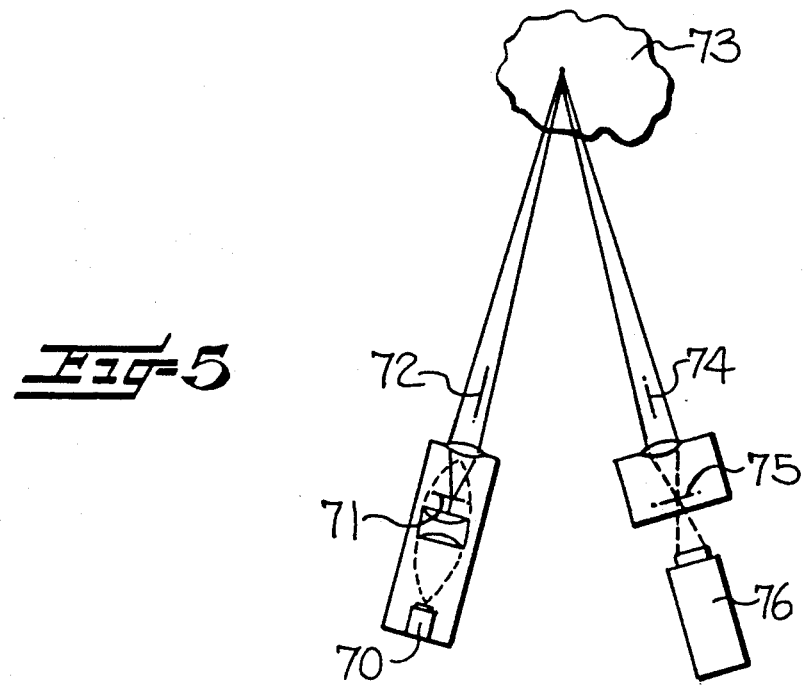
FIG. 5 is a schematic diagram illustrating the generation of Moire fringe patterns for an object.

Referring to FIG. 5, Moire fringes of an object to be inspected are generated and provided to the optical processor rather than the image of the object itself. This preprocessing simplifies the image by essentially identifying only the three dimensional contours. To employ this technique, light is transmitted from a source 70 through fine grating 71 along optical path 72 to the object 73. The light reflected from the object along optical path 74 is viewed through grating 75, which is identical to grating 71. The interference of the projected grating pattern and the viewing pattern results in a beat pattern of alternating light and dark bands known as Moire fringes. These fringes change dramatically with small depth related differences in the object. They can highlight defects by magnifying their effect many times. They also can exclude surface, non-depth related detail since only depth related changes cause differences in the Moire fringes. The fringes are viewed by sensor 76 which corresponds to the video camera 2 in FIG. 1.

Moire preprocessing may also be done using a subtraction technique. First, a Moire fringe pattern of the master object is used as the target grating 75. When the Moire fringes of the object to be tested are superimposed on the known target grating, the elements of the pattern which are the same cancel out, leaving only the differences. Thus, all differences over a certain threshold confirm a defect. And, by determining the spatial frequencies of the defect it may be possible to obtain further information about the nature of the defect.

FIG. 8 illustrates an embodiment of the invention using a different embodiment of a detector. The image of an object 1 to be processed is received by a device such as a video camera 2 that generates a first electrical signal in response to an image from the object. A laser 4 provides a beam of collimated light 5 that is incident upon a spatial light modulator 6. The modulator forms an image of the object in response to the first electrical signal, which may be preprocessed, and the image is transferred to the coherent light beam. A Fourier or other transform image of the modulated coherent light beam is formed by the means 7. Via mirror 81 and lens 82, both disposed in the optical path, the Fourier transform image is focused onto the photodetector 83.

A sampling disk 84 is disposed for rotation around its center with a ring of the disk disposed in the optical path. It includes selected opaque and transparent regions to block and transmit light, and may be a glass disk with a patterned opaque coating 89 (See, for example, FIG. 6A) or an opaque metal disk with portions etched away (not shown). The ring portion in the optical path includes a plurality of predetermined wedge and ring patterns that are sequentially inserted into the optical path as the disk rotates. The patterns comprise opaque and transparent regions that selectively block and transmit portions of the Fourier or other transform image to the detector 83.

FIG. 6 illustrates an embodiment 85 of a suitable sampling disk. It is mounted for rotation around center C. The outer most ring 86 comprises alternating transparent 87 and opaque 88 radially disposed segments which form timing marks for a standard sensing tachometer 112. Inboard of the outer most ring 86 is a concentric ring 90. In the quarter section designated by arc 91, ring 90 includes a plurality of circular masks. Each mask occupies a circular area of approximately the same diameter as the Fourier or other transform image in the optical path. A portion of the area of each mask is opaque, and it defines a pair of transparent wedge-shaped or pie-shaped segments. Each segment has a predetermined number of arc degrees and is orientated at a predetermined angle. For instance, aperture 92 may include a pair of point-to-point wedges, each wedge being 22.5 arc degrees with one wedge centered at 90 degrees and the other centered at 270 degrees. A second mask 93 in ring 90 may include a pair of wedges also of 22.5 arc degrees each, with the wedges centered at 22.5 degrees and 202.5 degrees. Depending upon the desired degree of resolution or other factors, the number of wedges, the arc degree width of each wedge, and the angular orientation of each wedge may vary as necessary or desirable. For example, two wedges may be used in each mask to improve the signal to noise ratio of the detector, and there may be 16 wedge masks.

In the second quarter circle of ring 90 designated by arc 95 there is a plurality of circular masks 94. Each of these masks is an opaque circle with transparent ring domains located at different diameters ranging from the center of the mask to its outermost portion.

FIG. 7 illustrates an alternate embodiment 100 for a disk having mask zones that generate a composite frequency-orientation signature for the transform image. The interior portion 101 is disposed in the optical path and may be cut or masked to define any of a variety of transparent shapes or openings 102 as necessary or desirable. The outer ring 103 consists of alternating opaque and transparent regions as timing marks. The mask 84 is attached at its center to a motor shaft 110, as part of motor 111, to rotate the disk with ring 90 or transparent shapes 102 disposed in the optical path to intercept the light beam 5. A standard photosensing tachometer 112 reads the timing track in the outermost ring of the disk. The output signal from the tachometer 112 is provided to a phase lock loop and clock generation circuit 113. This circuit monitors the rotational position of disk 84 and generates a representative signal which is used to synchronize the operation of the photodetector circuitry to each mask on the disk. It also provides a feedback signal to a servo control circuit 114 for controlling the rotational speed of the motor shaft 110.

In operation, each wedge or ring mask on disk 84 transmits one region of the incident Fourier transform image, as illustrated in zones 1–14 of FIG. 4. For instance, wedge domain 93 may provide a reading for zone 12 in FIG. 4, and ring mask 94 may provide a reading that corresponds to zone 2 in FIG. 4. As the disk rotates during the presence of a single Fourier transform image, individual segments of the image fall upon the photodetector 83. Photodetector 83 generates an output signal proportional to the intensity of the transmitted segment of the image. If necessary, the signal is converted to a voltage by means 120, such as a logarithmic current to voltage circuit. The voltage is output on line 120A to sample and hold circuit 121 which, in combination with the disk rotational position signal from the phase lock loop and clock generation circuitry 113 on line 122, provides a signal on line 123 that is a function of the intensity of the sampled portion of the Fourier transform image. Thus, the summing of the intensity in each segment of the Fourier or other transform image is done optically, rather than electronically by the summing RAM 46 of FIG. 3.

The signal on line 123 is converted to a digital signal by the analog-to-digital conversion means 124, stored in buffer 125, and provided to a data processor 126 for any further analysis or comparison with a known Fourier transform signature. The data processing means 126 may also provide a signal to an optics alignment adjustment means 130 to automatically adjust the position of the mirror 81. This centers the optical path on the appropriate portion of the rotating disk and places it in alignment with the photodiode 83.

Figure 9:
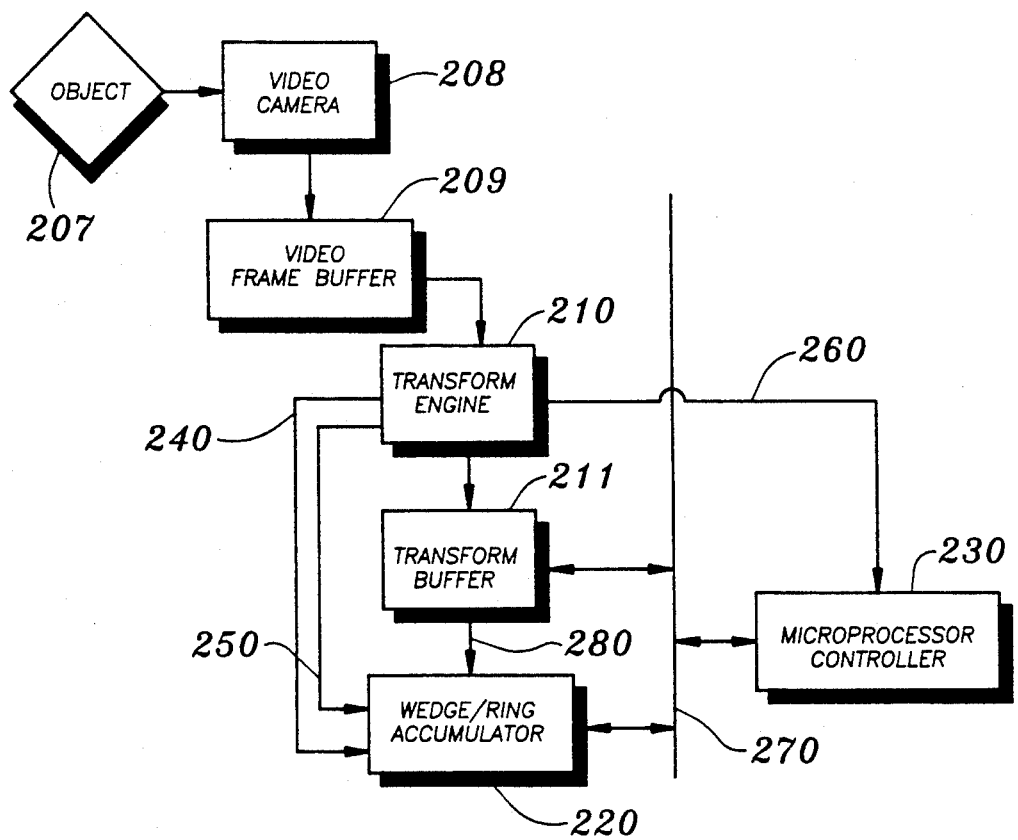
FIG. 9 is a schematic block diagram illustrating a third embodiment of the system of the present invention.

Referring now to FIG. 9, another embodiment of the system of the present invention is shown. This embodiment is different from those previously described in that the transform data is generated electronically rather than optically, as will be described in more detail. This digital transform data can be provided by a vector processing chip such as the chip manufactured by the Zoran Company denoted ZR34161 which is a member of the Zoran family of high performance systems processors.

The adder section of this embodiment is also different from the adder sections previously described in that in this embodiment the accumulation of both wedge and ring data occurs in parallel. Parallel accumulation provides a high speed system. Moreover, when used with a digitally obtained transform system, only one-half of the transform need be calculated to describe the input completely since the symmetric property of the transform may be relied upon. In one example, the transform is first calculated for rows to obtain intermediate data and then for columns to obtain final transform data. In this example, all matrix row calculations may be calculated but only one-half the matrix columns need be calculated to thereby obtain only one-half of the Fourier transform of the image. One fourth of the calculation time is thereby saved. This property can be relied upon when the transform is calculated digitally because the digital method provides more precise transform data. A transform created optically should have the same property but in practice it very rarely does. Accordingly, for an optical transform system, the wedge/ring accumulation should be performed across the entire transform image in order to achieve accurate results.

The present embodiment of the wedge/ring accumulator is designed as a pipeline in that the accumulation occurs sequentially, and synchronous with other processes. By pipelining calculations, the wedge/ring accumulation is invisible to the system in that it is accomplished at the same time that the transform data is written back into memory. No additional time delay occurs for accumulation.

Referring now to FIG. 9, the relationship of the four major system blocks of the digital transform embodiment is shown. A video camera 208 captures an image of the object 207. The video frame buffer 209 stores the video data from the camera representing the image of the object in line/pixel form. For example, video frame buffer 209 may include 512×512 locations, with each location corresponding to a pixel of video data from the data video camera, and eight bits of intensity information for each pixel. Data from the video frame buffer 209 is transferred to the transform engine 210 (for example the above mentioned Zoran vector processing chip) for conversion to Fourier transform data. In one embodiment 512×512 pixels of two dimensional video data are transferred to 512×512 points of two dimensional Fourier transform data. Since the digital generation of the Fourier transform data is very precise, only half the Fourier transform data (e.g. 512×256 points) need be generated. The transform engine 210 generates the two dimensional transform data of the image data provided to the engine from the video frame buffer 209. In one embodiment the 512×512 pixels are transformed to Fourier data by performing transform calculations on each column, and then performing calculations upon each row. According to the present invention, all column calculations must be performed to obtain 512×512 intermediate data values, but only 256 row calculations need to be performed to obtain 512×256 Fourier transform data points. Accordingly, a 25% speed savings is obtained by performing the transform digitally (electronically) rather than optically. The transformed data, and any intermediate data is placed in transform data buffer 211, which may be a 256×256 ×8 bit buffer.

The wedge/ring accumulator 220 maps each transform data point in transform buffer 221 into both a unique wedge and ring zone. The terms "wedge" and "ring" refer to locations on the transform plane. In optical type systems, a mask detector divides the symmetric transform plane in half along the diameter. One half has transparent wedge-shaped sections, the other half has transparent ring-shaped sections, as described in the parent application. In a digital system, as illustrated in FIG. 9, digital transform data is mapped to wedge and ring locations using a memory look-up table 322, as described a connection with FIG. 11. If the embodiment used has sixteen wedges and sixteen rings, thirty-two accumulation values are computed for each image.

The microprocessor controller 230 controls the transform engine 210, and the wedge/ring accumulator 220 through the microprocessor bus 270, and reads the final accumulated wedge and ring values from the wedge/ring accumulator 220.

The processing of the wedge/ring accumulator 220 may be made transparent to the system since the accumulations take place as each Fourier transform data point is written to memory 211 in the transform engine. In other words, wedge/ring accumulation takes place as the Fourier transform data begins to fill buffer 211, rather than waiting until the buffer 211 is entirely filled. In order to accomplish this, memory bus 240 is provided between transform engine 210 and the wedge/ring accumulator 220 so that the data and address of each transform data point can be captured by the wedge/ring accumulator as it is generated. Also, a transform memory write signal 250 is provided to the accumulator 220 to indicate that the final (as opposed to intermediate) transform data is being written into buffer 221. The wedge/ring accumulator 22 captures the transform memory bus 240 address as each signal 250 goes active. This value is uniquely mapped to both a wedge and a ring corresponding to the transform memory bus data currently on the bus in a manner described more particularly below.

The accumulation of wedge/ring data occurs within the wedge/ring accumulator 220. When the transform engine 210 has written the last transform data point back into memory 211, an interrupt is generated on line 260 to alert the microprocessor controller unit 230. The microprocessor controller 230 then reads the accumulated wedge and ring values from the wedge/ring accumulator 220 via the bus 270. After reading this data, the microprocessor controller clears all wedge/ring accumulation registers in the wedge/ring accumulator in preparation for the next cycle.

Figure 10:
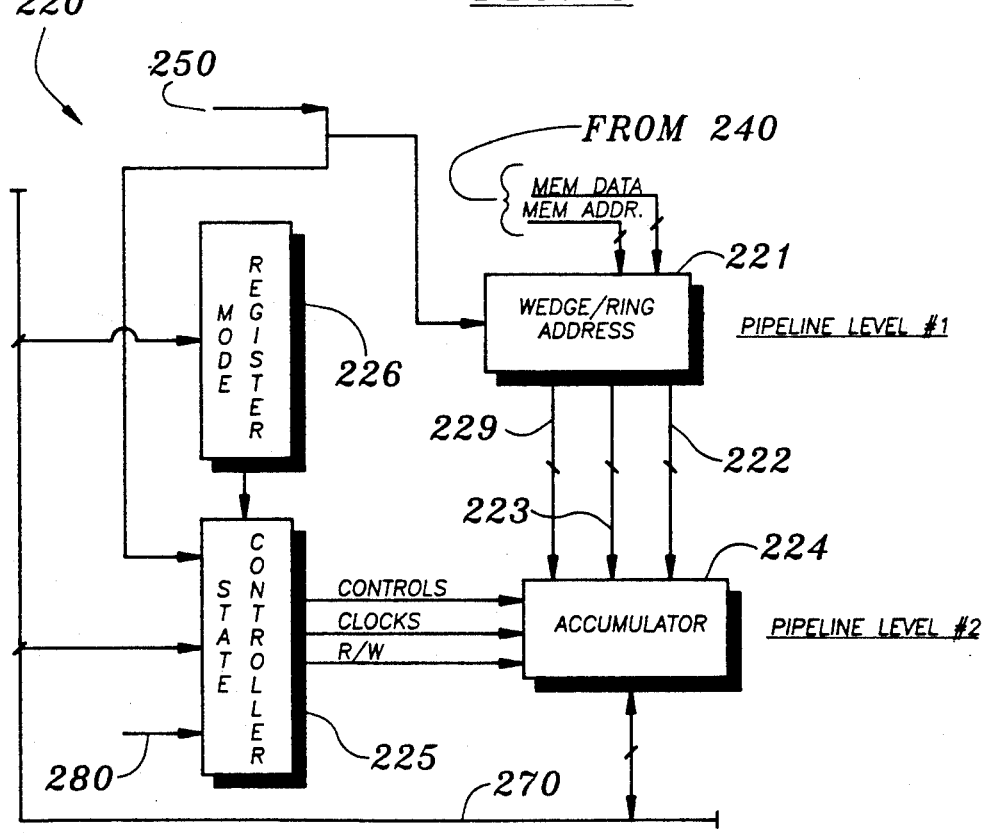
FIG. 10 is a block diagram of the parallel wedge/ring accumulator of the present invention.

Referring now to FIG. 10, a high level block diagram of the wedge/ring accumulator 220 is shown. The wedge/ring accumulator is constructed in two pipeline levels. The first level of the pipeline is the wedge/ring addresser 221. In this level of the wedge/ring accumulator, the captured address from the transform memory bus 240 is split into two smaller addresses. One address, wedge address 229, is for the previously stored wedge data to sum with the current data point. The other address, ring address 222, is for the corresponding previously stored ring data to sum with the current data point. The wedge address and ring address are typically four bits each. The intensity data that corresponds to these two addresses are termed the wedge/ring data 223, and are transmitted in phase with the newly generated addresses to the second pipeline level.

In level two of the wedge/ring accumulator, the data is accumulated into one each of the sixteen wedges and sixteen rings by accumulators 224. The addresses generated in level one designate the wedge and ring to which the related data is summed. The previous accumulation value for each of the selected wedge and ring are first read and then added to the wedge/ring data 223. The newly created wedge and ring accumulator values are then written back to the same storage area of the second pipeline level. This is a read/modify cycle that occurs for each transform data point generated by the transform engine 210. The transform memory write signal 250 is the master clock signal that moves data through both levels of the pipeline. The read/modify cycle timing is generated by the state controller 225. The transform engine has a transform clock signal 280 which is the basic engine time source used to synchronize the wedge/ring accumulator 220 to the engine 210. The read and modify timing signals coming from the state controller 225 are in phase with the signal 250 but are much faster so that both a read, summation and write are accomplished for each signal 250. This may be accomplished by using a transform clock 280 to drive the state controller 225 and generating signal 250 from the transform clock signal 280.

The state controller 225 operation is controlled by the mode register 226. The mode register 226 is a storage location that informs the wedge/ring accumulator whether normal accumulation is in process or the microprocessor controller 230 is ready to control the wedge/ring accumulator 220 to read the final wedges and rings and to zero the accumulators.

Figure 11:
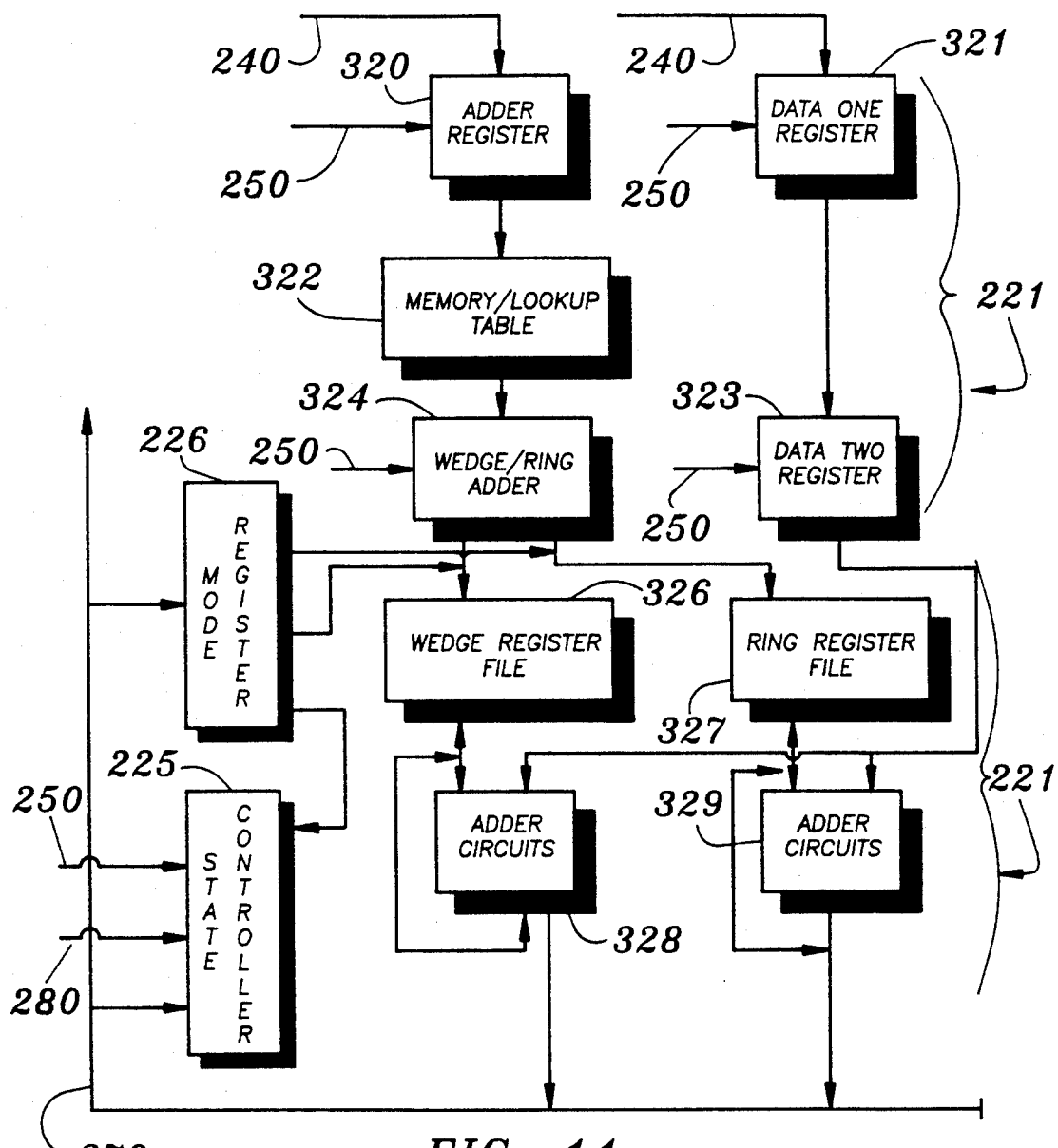
FIG. 11 is a detailed schematic diagram of the parallel wedge/ring accumulator of the present invention.

Referring now to FIG. 11, a more detailed block diagram of the wedge/ring adder 221 and wedge/ring accumulator 224 is shown.

The operation of pipeline level one (the wedge/ring adder 221) begins when the memory write signal 250 goes active causing the adder register 320 to store or capture the address carried on line 240 and the data one register 321 to capture the current data on the transform memory bus 240.

The adder register output forms the input address to the memory/lookup table 322. The lookup table 322 contains a four bit wedge address and a four bit ring address for each data location in the transform data plane, 64K bytes (512×512×8) in the current embodiment. At the end of each pipeline cycle, the transform data from data one register 321 and the two corresponding wedge/ring addresses from the lookup table 322 are stable and prepared for loading into the data two register 323 and wedge/ring adder register 324 respectively of pipeline level two (accumulator 224).

Each memory write signal 250 loads the data from memory/look up table 322 and data one register 321 into wedge ring adder 324 and data two register 323 respectively. In other words, data is moved from pipeline level one to pipeline level two. Simultaneously new data is loaded into pipeline level one. The wedge/ring adder register 324 stores the two addresses indicating which wedge and ring are to be modified. The addresses are input to the wedge and ring register file 326 and 327 respectively and the read portion of the read and modify cycle begins.

The read cycle notifies the addressed wedge and ring locations in files 326 and 327 to present the current accumulator values to the input of the adder circuits 328 and 329. The accumulator values are added to the transform data stored in the data two register 323. This updates or modifies the accumulator values for the current data location and is the modify portion of the read/modify cycle.

At this point, the adder circuits 328 and 329 return the modified accumulator values to the register files 326 and 327. In addition, the state controller 225 issues a write strobe storing the new values back into the same locations from which they were read.

The above process for both pipelines is repeated once for each data location in the transform data plane. When the transform engine 210 is finished writing the Fourier or other transform data back to memory, the accumulated values of sixteen wedges and sixteen rings are stored in the two register files 326 and 327.

The microprocessor controller 230 then receives an interrupt signal 260 from the transform engine 210 (See FIG. 9), indicating that the transform computation is complete. The microprocessor controller loads the mode register 226 with a new code to allow the microprocessor controller to control the operation of pipeline two. The mode register 226 also is loaded with the address of the wedge and ring the microprocessor controller wishes to read. The state controller 225 issues read and write strobes to the register file under the control of the microprocessor controller. All sixteen wedges and rings are read and zeros are replaced in each register file location in preparation for the next accumulation cycle.

Having described the detailed embodiments of wedge/ring accumulator 220, it will be understood by those having skill in the art that the wedge ring accumulator greatly speeds up wedge/ring calculations by providing parallel calculations of wedge and ring data and providing pipelined operation of the accumulator elements so that these elements need not be idle during wedge/ring calculation. It will also be understood by those having skill in the art that the wedge ring accumulator described above may also be employed in connection with an optically generated transfer system described in connection with FIG. 1. An optically generated transform system having the improved wedge/ring accumulator of FIGS. 10-11 is described in FIG. 12.

Figure 12:
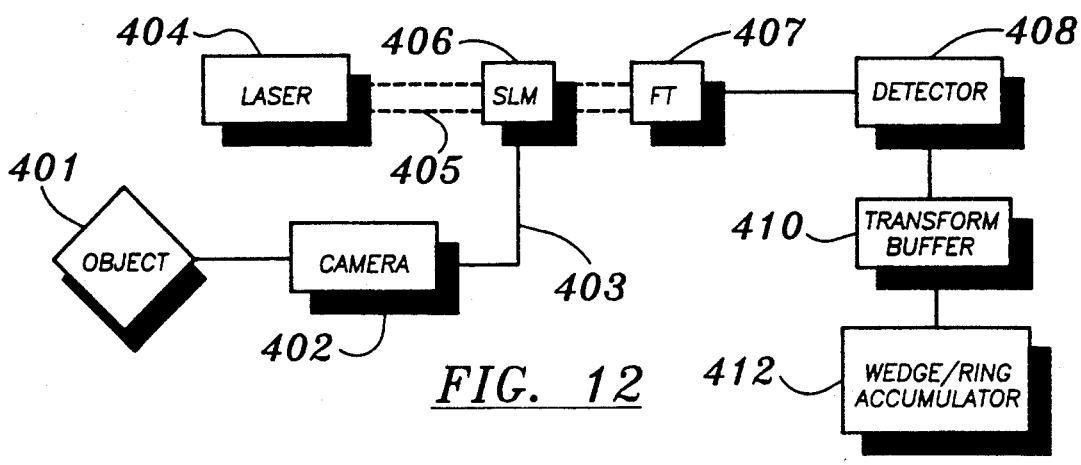
FIG. 12 is a diagram of an optical transform system employing the parallel wedge/ring accumulator of the present invention.

Referring to FIG. 12, a block diagram of the optical Fourier or other transform embodiment is shown, employing the parallel wedge/ring accumulator structure. As with FIG. 1, the object 401 to be optically transformed may be the actual object, such as a bottle, can, metal part, etc., or the image of an object that is generated in a focal plane for the video camera. Alternatively, it may be a preprocessed image that has been enhanced or filtered to highlight certain features or suppress a background, or it may be a presentation of the Moire interference fringes representing the three dimensional features of the object.

The image of the object is brought into the optical processing system by some means for generating an electrical signal in response to the image, such as a standard video camera 402. It may be any of several video cameras that are currently commercially available and have, for example, an RS-170 electric output. The output is present on line 403. While the image output of a standard video camera is readily decoded and transformed into a recognizable image by a commercially available television, other means, such as an electronic or electro-mechanical scanner, may be used.

A laser 404, or other device, provides a coherent beam of light 405 and defines an optical path for the optical processing system. It may be a laser diode or gas laser. The output power from the laser may be monitored by a photodetector which intercepts a reverse beam from the laser, or a portion split from the output beam. The signal from the photodetector is used as part of a feedback loop to adjust the output power from the laser. The optical path in FIG. 12 is illustrated as being linear, although it may be bent as necessary or desirable using mirrors, prisms, or other suitable means.

A spatial light modulator 406 is disposed in the optical path and displays the image captured by the video camera 402 as represented by the electrical signal on line 403. The spatial light modulator of the present invention may be a liquid crystal device, as is commercially available. A liquid crystal device typically comprises a liquid crystal cell sandwiched between a pair of polarizers. The liquid crystal cell comprises individually addressable liquid crystal modules that are disposed in a two dimensional array.

The coherent light beam 405, modulated with the image of the object by the spatial light modulator, is incident upon still further means 407 in the optical path for forming the Fourier transform or signature of the image of the object.

The Fourier or other transform is detected by detector 408 and the transform data points are placed in a transform buffer 410. Transform buffer 410 corresponds to transform buffer 221 of FIG. 9. Once in transform buffer 410, wedge/ring accumulation takes place in wedge/ring accumulator 412, which corresponds to wedge/ring accumulator 220 of FIG. 9. The parallel wedge/ring accumulator 412 is compatible with the optically derived Fourier or other transform.

In another aspect of the present invention, a neural network is employed to analyze and classify the collection of electronically derived summed zone data values (such as wedge and ring data values). The neural network may be used in connection with or instead of processor 10 (FIG. 1) in an all electronic image processing system (FIG. 9) or a hybrid optical/digital image processing system (FIG. 12). Neural networks are well known to those skilled in the art and are presently available as off-the-shelf components. In general, neural networks are highly distributed nonprogrammed adaptive computing systems based on multiprocessor architectures and varied dense interconnection schemes, which may be embodied in hardware or run under hardware or software simulation. Each neuronlike processing element (PE) has a small amount of local memory and can perform its entire computation function based on only local data passed to it through interconnections with other neurons. Transfer functions define the computation local data to each PE, which is generally a nonlinear modification of a discrete integral of products of weighted sums. Each PE has a single output, and input to a PE from another PE has a weight that functions either as an inhibitory or excitatory influence on the input. During the training or learning phase, a learning function describes the adjusting of the PE weights according to the layer and network type. Interconnection schemes vary widely, from fully interconnected networks where every PE is connected to every other PE, to layered slabs where the output of each PE on one slab fans out as input to each PE on the next slab. Some artificial neural systems incorporate only feedforward data flow, others use more sophisticated nonlinear feedback during learning and recall.

Two topologies are generally used for neural networks; back-propagation and counter-propagation. The back-propagation (BPN) and counter-propagation (CPN) networks are both three-layer, feed-forward networks mapping functions ($\phi: R^n \geq R^m$) which map n-dimensional input vectors to m-dimensional output vectors. BPN is one of the more well-known neural networks. BPN is a generalized gradient descent algorithm that adaptively adjusts its weights during training to minimize the mean-squared error between the actual and the desired output. After the output of a computation is reached on the final or output layer, error values are sequentially propagated to previous network layers. Theoretically, the CPN trains itself to be a near-optimal, equi-probable lookup table. In its complete form, CPN represents both a $\phi$ and $\phi^{-1}$ inverse mapping, and lookups can occur in forward or backward mode.

Figure 13:
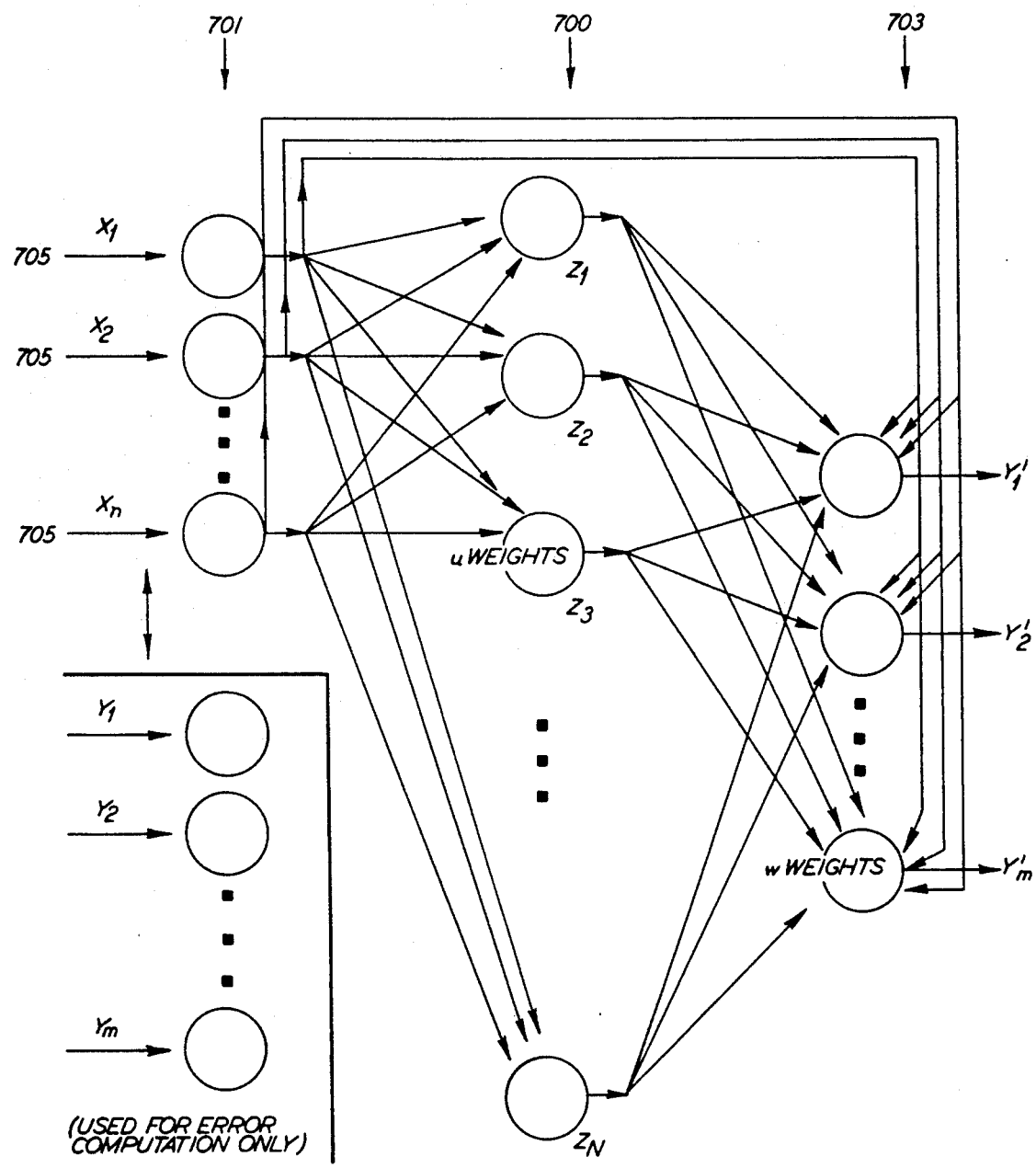
FIG. 13 is a diagram of the structure and operation of a neural network of the back propagation network type.

Referring now to FIG. 13, BPN encodes its memory as a set of internally determined features on the middle or hidden layer of the network 700. The set of weights across all PEs on this layer represents a distributed memory. After training and subsequent adaptive adjustment of weights according to the least-mean-square criteria, an input feature signature pattern 705 stimulates a distributed pattern of activity in the middle layer which is interpreted by the output layer 703 as a particular class of pattern. In this sense, BPN becomes a piecewise linear classifier in an n-dimensional space. Each input from the input layer 701 contributes to the output of each middle layer PE, and each middle layer PE contributes to the output patterns formed at the output layer. BPN theory is based on the concept of batching the error corrections for a number of training examples before weight updates are made. A second principle of momentum, similar to random temperature fluctuations in simulated annealing, is sometimes required to ensure convergence of the learning without entrapment in local minima.

Figure 14:
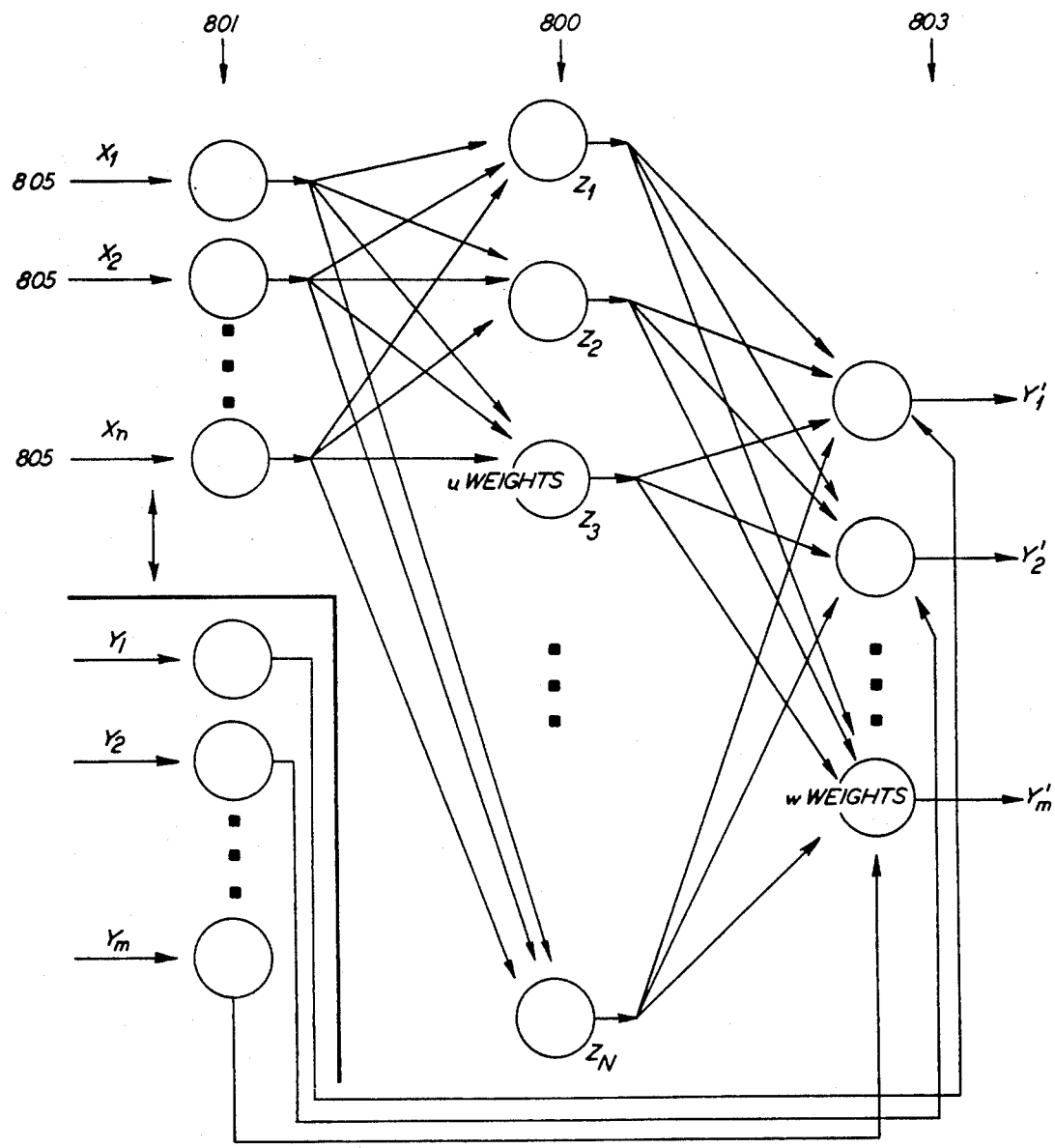
FIG. 14 is a diagram of the structure and operation of a neural network of the counter propagation network type.

Referring now to FIG. 14, CPN on the other hand, uses its middle layer 800 to teach itself a set of matched filter-like exemplars that generalize the input patterns 805 it receives during training. One of these PEs wins a competition as the best matched nearest-neighbor to the input feature signature. This winner outputs a 1 (all others output 0), and during training its weights are then adjusted to rotate the weight vector toward the input vector (later CPN versions support multiple winners). Under the proper conditions, this type of self-organization scheme allows the weight vectors to move about during training until they form a statistically optimal representation of the training set. Theoretically, when training is completed, the weight vectors will be grouped into clusters on the surface of the hypersphere, which provides a statistical representation of the training-set sampling. The resulting lookup table can be shown to be equi-probable for all winning PEs. Counter propagation, although not optimal in the same sense as back propagation, is attractive in that the middle-layer 800 generalized PE exemplars can be viewed as a generalized statistical distribution of the feature signature space. This property can be potentially used to track drift in the inspection process. The output layer 803 in CPN implements Grossberg learning, resulting in PEs that, in steady-state, learn the average of all inputs during training time.

Both networks require a period of training before test patterns are submitted for analysis and classification. A statistically significant set of training exemplars must be accumulated. The training set consists of (x,y) pairs, where $x = x_1, \ldots, X_n$ is the input feature signature vector and $y = y_1, \ldots, y_m$ represents the desired output vector for the mapping. After the network has been trained, the adaptive learning function is turned off, and feature signatures are submitted for testing. Each network is expected to produce a consistent $x \rightarrow y$ mapping based on its learned memory structure.

Preferably, the Hecht-Nielson NeuroComputer Corporation's HNC AZ1000 ANZA neurocomputer is used in this application. However, other suitable systems may also be used. As previously mentioned, neural networks are well known to those skilled in the art as evidenced by the following publications which are expressly incorporated herein by reference: (1) "Optical Processing and Neurocomputing in an Automated Inspection System", David E. Glover, *Journal of Neural Network Computing*, Fall, 1989; (2) "An Automated Inspection System Based on Neural Network Classification of Optically Derived 2-D Fourier Feature Signatures", David E. Glover; (3) "Incorporating Optical Processing and Neurocomputing into a Novel Automated Inspection System", David E. Glover (to appear in *Journal of Neural Network Computing*); (4) "Automated Inspection via Neural Network Classification of Optically Derived 2-D Fourier Feature Signatures", David E. Glover (to appear in the *Proceedings of the Instrument Society of America* ISA/88 Conference (Houston, October, 1988); (5) "Automated Quality and Process Control Based on an Optical Fourier/Electronic Neurocomputer Inspection System", David E. Glover, Ph.D., First Annual Meeting, International Neural Network Society, Sept. 6-10, 1988, Boston; (6) "Real-Time Image Classification Based on Neural Network Classification of Optically Derived 2-D Fourier Feature Signature", David E. Glover (To appear in *Proceedings of the Neural Architectures for Computer Vision Workshop* AAAI-88 (Minneapolis/St. Paul, August 1988); (7) "A Hydrid Optical Fourier/Electronic Neurocomputer Machine Vision Inspection System", David E. Glover (To appear in *Proceedings of the Vision '88 Conference* (June, 1988, Detroit) sponsored by the Society of Manufacturing Engineers, Dearborn, Mich.).

In the drawings and specification there have been set forth exemplary embodiments of the invention. It should be understood that while specific terms are employed, they are used in a generic and descriptive sense only and not for purposes of limitation. For example, other types of transforms can be employed such as Fourier-Mellin transforms. The claims define the invention and are intended to encompass other embodiments and equivalents that would be apparent to one skilled in the art having the benefit of the teachings of this disclosure.

That which we claim is:

1. An apparatus for detecting the transform of an image comprising:
   means for generating a transform image from an image;
   means for generating a relatively large number of transform digital data points from the transform image, each transform digital data point including an area portion digital data value identifying an area located within the transform image, and a corresponding feature portion digital data value identifying a feature of the transform image in the located area;
   means for associating each of said relatively large number of transform digital data points with at least one of a relatively small number of zones, in response to the area portion digital data value associated with the transform digital data point, such that the associated zone includes the located area of the transform image represented by the corresponding transform digital data points;
   means for generating a summed transform digital data value for each of said relatively small number of zones, each summed transform digital data value being the cumulation of any previous feature portion digital data values for the predetermined zone, to obtain a relatively small number of summed transform image data values representing said relatively large number of transform digital data points; and
   means for retrievably storing the summed transform image data value for each predetermined zone, to detect the transform of said image from said relatively small number of summed transform image data values, rather than said relatively large number of transform composite digital data points.

2. The apparatus of claim 1 wherein the means for generating a relatively large number of transform digital data points includes means for scanning an image.

3. The apparatus of claim 1 wherein the means for generating a relatively large number of transform digital data points comprises means for generating a plurality of successive transform digital data points, and the means for associating comprises means for successively associating each of said respectively large number of transform digital data points with at least one of a relatively small number of zones.

4. The apparatus of claim 1 wherein the means for generating a relatively large number of transform digital data points comprises means for generating a feature portion digital data value in response to the intensity of the transform image in the located area.

5. The apparatus of claim 1 wherein the means for generating a relatively large number of transform digital data points comprises means for generating an area portion digital data value representing an address signal for each predetermined area located within the transform image.

6. The apparatus of claim 1 wherein the means for associating comprises means for receiving the area portion digital data value of the transform digital data point as an address signal.

7. The apparatus of claim 1 wherein the means for associating comprises means for retrievably storing a predetermined zone signal at a predetermined address.

8. The apparatus of claim 1 wherein the means for associating comprises means for associating each of said relatively large number of digital data points with a single one of a relatively small number of zones in response to the area portion digital data value.

9. The apparatus of claim 1 wherein the means for associating comprises means for generating predetermined wedge-ring digital data values in response to an area portion digital data value and identifying a predetermined wedge/ring that includes the located area of the transform image represented by the corresponding transform digital data point.

10. The apparatus of claim 9 wherein said means for generating a summed transform digital data value comprises means for summing the wedge/ring digital data values in parallel.

11. The apparatus of claim 9 wherein said means for generating a summed transform digital data value comprises means for summing the wedge/ring digital data values sequentially.

12. The apparatus of claim 1 wherein the means for generating a summed transform digital data value comprises means for receiving the zone as an address for stored data and adding the feature portion digital data value and stored summed digital data value corresponding to the received zone to generate the summed transform image image data value.

13. The apparatus of claim 1 wherein the means for generating a transform image comprises optical means for generating said transform image.

14. The apparatus of claim 13 wherein said optical means comprises:
   means for providing a two dimensional optical image;
   optical transform means for optically forming a two dimensional transform image of said two dimensional optical image; and wherein said means for generating a relatively large number of transform digital data points comprises:
   detector means for detecting said two dimensional transform image to generate said transform digital data points.

15. The apparatus of claim 14 wherein said two-dimensional optical image providing means comprises a spatial light modulator.

16. The apparatus of claim 14 wherein said optical transform means comprises a transform lens.

17. The apparatus of claim 14 wherein said detector means comprises a camera.

18. The apparatus of claim 1 wherein the means for generating a relatively large number of transform digital data points comprises digital electronic means for forming said transform digital data points.

19. The apparatus of claim 18 wherein said means for generating a transform image comprises:
   first memory means for storing therein a two dimensional digitized representation of a said image;
   digital transform means for digitally forming a two dimensional digital transform of said two dimensional digitized representation; and
   second memory means for storing therein said two dimensional digital transform.

20. The apparatus of claim 19 wherein said first memory means comprises a video frame buffer.

21. The apparatus of claim 18 wherein said neural network comprises a back propagation type neural network.

22. The apparatus of claim 18 wherein said neural network comprising a counter propagation type neural network.

23. The apparatus of claim 18 wherein said digital electronic means comprises a vector processor.

24. The apparatus of claim 1 further comprising:
   neural network processing means connected to said retrievably storing means for processing said summed transform image data value.

25. The apparatus of claim 1 wherein the means for associating comprises:
   means for associating each of said relatively large number of transform digital data points with a pair of predetermined zone signals, each said pair of predetermined zone signals being generated in response to an area portion digital data value and identifying a predetermined wedge zone and ring zone that includes the located area of said transform image in the located area.

26. The apparatus of claim 25 wherein the means for generating a summed transform digital data value comprises:
   means for generating, in parallel, a pair of summed transform digital data values corresponding to said pair of predetermined zones, the first of said pair of summed transform digital data values, being the cumulation of any previous feature portion digital data values for the predetermined wedge zone, the second of said pair of summed transform digital data values being the cumulation of any previous feature portion digital data values for the predetermined ring zone.

27. The apparatus of claim 25 further comprising:
   neural network processing means connected to said retrievably storing means for processing said summed image digital data value.

28. The apparatus of claim 27 wherein said neural network comprises a back propagation type neural network.

29. The apparatus of claim 27 wherein said neural network comprises a counter propagation type neural network.

30. The apparatus of claim 1 wherein said means for generating a transform image comprises:
   means for generating a Fourier transform.

31. The apparatus of claim 1 wherein the means for generating a relatively large number of transform digital data points comprises means for generating a standard television composite signal comprising a video signal and a frame location signal.

32. The apparatus of claim 1 wherein the means for generating a zone signal comprises an addressable memory.

33. The apparatus of claim 1 wherein the associating means comprises means for associating a single predetermined zone signal with each transform digital data point in response to the area portion digital value associated therewith.

34. The apparatus of claim 1 wherein the associating means comprising means for converting a line-pixel location signal to a wedge-ring map location signal.

35. The apparatus of claim 1 wherein the means for generating a summed transform digital data value comprises a summing random access memory device.

36. The apparatus of claim 1 further comprising means for generating clock signals for processing image signals in real time as they are generated.

37. The apparatus of claim 1 further comprising means for comparing the summed transform image to a relatively small number of reference digital data values representing a known image and for producing an output signal characteristic of any differences between the reference values and the summed image values.

38. An apparatus for detecting the transform of an image comprising:
   means for generating a plurality of transform composite image signals, including means for generating an area portion signal identifying an area located within the transform image and a corresponding feature portion signal identifying a feature of the transform image in the located area;
   means for generating a predetermined zone signal, each zone signal being generated in response to an area portion signal and identifying a predetermined zone that includes the located area of the transform image represented by the incoming area portion signal;
   means for generating a summed transform image signal corresponding to a predetermined zone signal, each summed transform image signal being the cumulation of any previous feature portion signals for the predetermined zone; and
   means for retrievably storing the current summed image signal for each predetermined zone;
   wherein the means for generating a predetermined zone signal comprises:
   means for generating a pair of predetermined zone signals, each said pair of predetermined zone signal being generated in response to an area portion signal and identifying a predetermined wedge zone and ring zone that includes the located area of said Fourier transform image in the located area;

wherein the means for generating a summed transform image signal comprises:

means for generating, in parallel, a pair of summed transform image signals corresponding to said pair of predetermined zone signals, the first of said pair of summed transform image signals being the cumulation of any previous feature portion signals for the predetermined wedge zone, the second of said pair of summed transform image signals being the cumulation of any previous feature portion signals for the predetermined ring zone; and wherein the means for generating, in parallel, a pair of summed transform image signals comprises:

a two level system, the first level receiving and storing new wedge and ring signals, the second level receiving the new wedge and ring data from said first level, summing the new wedge and ring data and the previous feature portion signals for the predetermined wedge and ring zones, substituting the sum of said new and previous feature portion signals for the predetermined wedge and ring zone in place of the previous feature portion signals for the predetermined wedge and ring zone.

39. An apparatus for detecting the transform of an image comprising:

means for generating a plurality of transform composite image signals, including means for generating an area portion signal identifying an area located within the transform image and a corresponding feature portion signal identifying a feature of the transform image in the located area;

means for generating a predetermined zone signal, each zone signal being generated in response to an area portion signal and identifying a predetermined zone that includes the located area of the transform image represented by the incoming area portion signal;

means for generating a summed transform image signal corresponding to a predetermined zone signal, each summed transform image signal being the cumulation of any previous feature portion signals for the predetermined zone; and means for retrievably storing the current summed image signal for each predetermined zone;

wherein said means for generating a plurality of transform composite image signals comprises:

means for generating a plurality of Fourier-Mellin transform composite image signals.

40. A method of detecting the transform of an image comprising the steps of:

generating a transform of an image from an image;

generating a relatively large number of transform digital data points form the transform image, by generating an area portion digital data value identifying an area located within the transform image and a corresponding feature portion digital data value identifying a feature of the transform image at the located area for each transform digital data point;

associating each of said relatively large number of transform digital data points with at least one of a relative small number of zones, in response to the area portion digital data value associated with the transform digital data point, such that the associated zone includes the located area of the transform image represented by the corresponding transform digital data point;

selectively generating a summed transform digital data value for each of said relatively small number of zones, by summing any previous feature portion digital data values for the predetermined zone to obtain a relatively small number of summed transform image data values representing said relatively large number of transform digital data points; and retrievably storing the summed transform image data value for each predetermined zone to detect the transform of said image by said relatively small number of summed transform image data values, rather than said relatively large number of transform digital data points.

41. The method of claim 40 wherein the step of generating a relatively large number of digital data points includes the step of scanning an image.

42. The method of claim 40 wherein the step of generating a relatively large number of transform digital data points comprises the step of generating a line-pixel location digital data value by scanning lines and pixel locations in each line for each transform image.

43. The method of claim 40 wherein the step of generating a relatively large number of transform digital data points comprises the step of generating a plurality of successive transform digital data points, and the associating step comprises the step of associating each successive transform digital data point with at least one of said predetermined zones.

44. The method of clam 40 wherein the step of generating a relatively large number of digital data points comprises the step of generating a feature portion signal digital data value in response to the intensity of the image in the located area.

45. The method of claim 40 wherein the step of generating a relatively large number of transform digital data points comprises the step of generating a standard broadcast television video signal comprising a video signal and a frame location signal.

46. The method of clam 40 wherein the associating step comprises the step of associating each of said relatively large number of digital data points with a single one of a relatively small number of zones, in response to the area portion digital data value.

47. The method of claim 40 wherein the associating step comprises the step of converting a line-pixel location signal to a wedge-ring location signal for a transform identification.

48. The method of claim 47 wherein said step of generating a summed transform digital data value comprises the step of summing the wedge/ring location signals in parallel.

49. The method of claim 47 wherein said step of generating a summed transform digital data value comprises the step of summing the wedge/ring location signals sequentially.

50. The method of claim 40 wherein the step of generating a summed transform digital data value comprises the steps of receiving the zone as an address for stored data and adding the feature portion digital data value and stored summed digital data value corresponding to the received zone to generate the summed transform image image data value.

51. The method of claim 50 wherein the associating step comprises the step of:

associating each of said relatively large number of transform digital data points with a pair of predetermined zone signals, each said pair of predetermined zone signals being generated in response to an area portion digital data value and identifying the located area of said image in the located area.

52. The method of claim 51 wherein the selectively generating a summed digital data value step comprises the step of:

generating, in parallel, a pair of summed digital data values corresponding to said pair of predetermined zones, the first of said pair of summed digital data values being the cumulation of any previous feature portion digital data values for the predetermined wedge zone, the second of said pair of summed digital data values being the cumulation of any previous feature portion digital data values for the predetermined ring zone.

53. The method of claim 40 further comprising classifying said generated summed transform image data values using neural network processing means.

54. The method of claim 40 wherein said step of generating a transform of an image comprises the step of:

optically generating a transform of an image.

55. The method of claim 54 wherein said optically generating step comprises the steps of:

providing a two dimensional optical image;

optically forming a two dimensional transform image of said two dimensional optical image; and wherein said generating a relatively large number of transform digital data points comprises the step of detecting said two dimensional transform image to generate said transform digital data points.

56. The apparatus of claim 55 further comprising classifying the retrievably stored summed transform image data values using neural network processing means.

57. The apparatus of claim 56 wherein said neural network comprises a back propagation type neural network.

58. The apparatus of claim 56 wherein said neural network comprises a counter propagation type neural network.

59. The method of claim 40 where said transform generating step comprises the step of:

storing the two dimensional digitized representation of said image;

digitally forming a two dimensional digital transform of said two dimensional digitized representation; and storing said two dimensional digital transform.

60. The method of claim 40 wherein said generating a transform step comprises the step of:

generating a Fourier transform.

61. A method of processing the features of a transform image in each of a plurality of predetermined zones, the method comprising the steps of:

generating a plurality of composite image signals by generating an area portion signal identifying an area located with the image and a corresponding feature portion signal identifying a feature of the image at the located area;

generating a predetermined zone signal in response to an area portion signal and identifying a predetermined zone that includes the located area of the transform image represented by the incoming area portion signal;

selectively generating a summed image signal corresponding to a predetermined zone signal by summing any previous feature portion signals for the predetermined zone; and retrievably storing the current summed image signal for each predetermined zone;

wherein the step of generating a summed image signal comprises the steps of receiving the zone signal as an address for stored data and adding the feature portion signal and stored summed image signal corresponding to the received zone signal to generate the current summed image signal;

wherein the step of generating a predetermined zone signal comprises the step of:

generating a pair of predetermined zone signals, each said pair of predetermined zone signals being generated in response to an area portion signal and identifying a predetermined wedge zone and ring zone that includes the located area of said image in the located area;

wherein the selectively generating a summed image signal step comprises the step of:

generating, in parallel, a pair of summed image signals corresponding to said pair of predetermined zone signals, the first of said pair of summed image signals being the cumulation of any previous feature portion signals for the predetermined wedge zone, the second of said pair of summed image signals being the cumulation of any previous feature portion signals for the predetermined ring zone; and wherein the generating, in parallel, a pair of summed image signals step comprises the step of:

providing a two level system, the first level receiving and storing new wedge and ring signals, the second level receiving the new wedge and ring data from said first level, summing the new wedge and ring data and the previous feature portion signals for the predetermined wedge and ring zones and substituting the sum of said new and previous feature portion signals for the predetermined wedge and ring zone in the place of the previous feature portion signals for the predetermined wedge and ring zone.

62. A method of processing the features of a transform image in each of a plurality of predetermined zones, the method comprising the steps of:

generating a plurality of composite image signals by generating an area portion signal identifying an area located within the image and a corresponding feature portion signal identifying a feature of the image at the located area;

generating a predetermined zone signal in response to an area portion signal and identifying a predetermined zone that includes the located area of the transform image represented by the incoming area portion signal;

selectively generating a summed image signal corresponding to a predetermined zone signal by summing any previous feature portion signals for the predetermined zone; and retrievably storing the current summed image signal for each predetermined zone;

wherein said generating a plurality of composite image signals step comprises the step of:

generating a plurality of Fourier-Mellin transform composite image signals.

* * * * *